UNITED STATES PATENT OFFICE.

WILLIAM A. FRENCH, OF PHILADELPHIA, PENNSYLVANIA.

IMPROVED COMPOUND FOR COATING THE SURFACES OF STEAM-BOILERS, &c.

Specification forming part of Letters Patent No. 94,882, dated September 14, 1869.

CASE A.

*To all whom it may concern:*

Be it known that I, WILLIAM A. FRENCH, of the city and county of Philadelphia, and State of Pennsylvania, have invented a new and improved compound for coating the surfaces of steam-boilers, steam-pipes, steam-drums, hot and cold water pipes, and other objects; and I do hereby declare that the following is a full, clear, and exact description thereof.

This invention relates to an improvement on plastering-cements which are employed as non-conducting coatings upon the surfaces of steam-boilers, steam-pipes, steam-drums, hot and cold water pipes, and other objects, for the purpose of preventing a rapid radiation or absorption of heat or cold. The object of my invention is to obtain a plastering-cement which shall possess superior non-conducting and adhesive properties, and, also, which shall be entirely free from odor.

The following is a description of my improved plastering-cement and the method of compounding the same: I take asbestus and crush it, so as to reduce it to fine fiber, and to this substance thus reduced I add to it an alkaline silicate of any kind, until the mass is brought to a plastic consistency. I prefer the use of silicate of soda, or silicate of potash, but do not confine myself to these substances, as other alkaline silicates will be found to answer a very good purpose. Thus prepared, the cement is plastered upon the surface of the desired object, and then covered with a cloth, canvas, or felt, and left to dry and harden thereon.

The dry or hardened compound or coating is very porous, having very much the appearance of pumice-stone, and it is very light and adhesive, properties which render it very useful for the purpose intended.

I do not confine myself to definite proportions of the substances named, as the proportions will vary according to the consistency required of the compound.

It is obvious that the cement will be free from odor, and that it will not be liable to crack and crumble when exposed to extremes of heat and cold.

What I claim as new, and desire to secure by Letters Patent, is—

A non-conducting coating or cement composed of the ingredients herein described.

WILLIAM A. FRENCH.

Witnesses:
EDWIN A. MORGAN,
JOHN L. LONGSTRETH.